July 18, 1944. U. C. HAREN 2,354,120
APPARATUS FOR ASSEMBLING SHEET MATERIALS
Filed Oct. 15, 1941 4 Sheets-Sheet 2
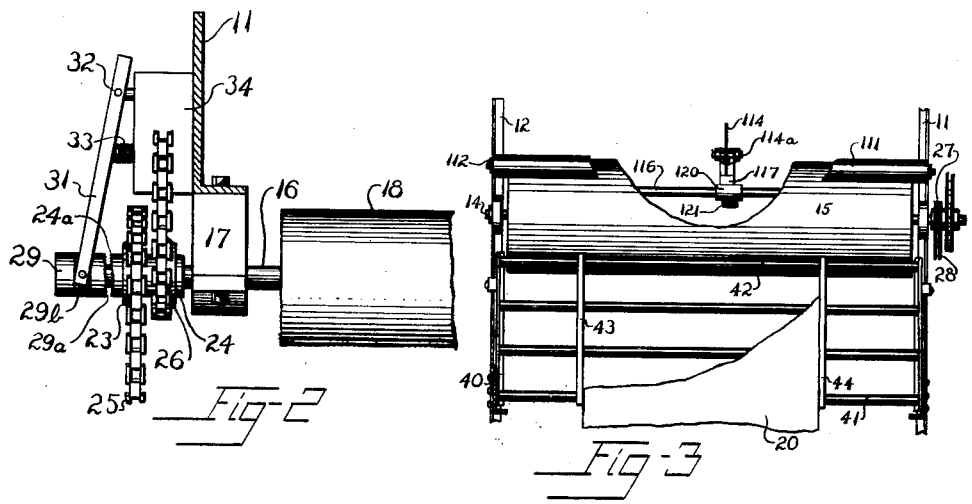
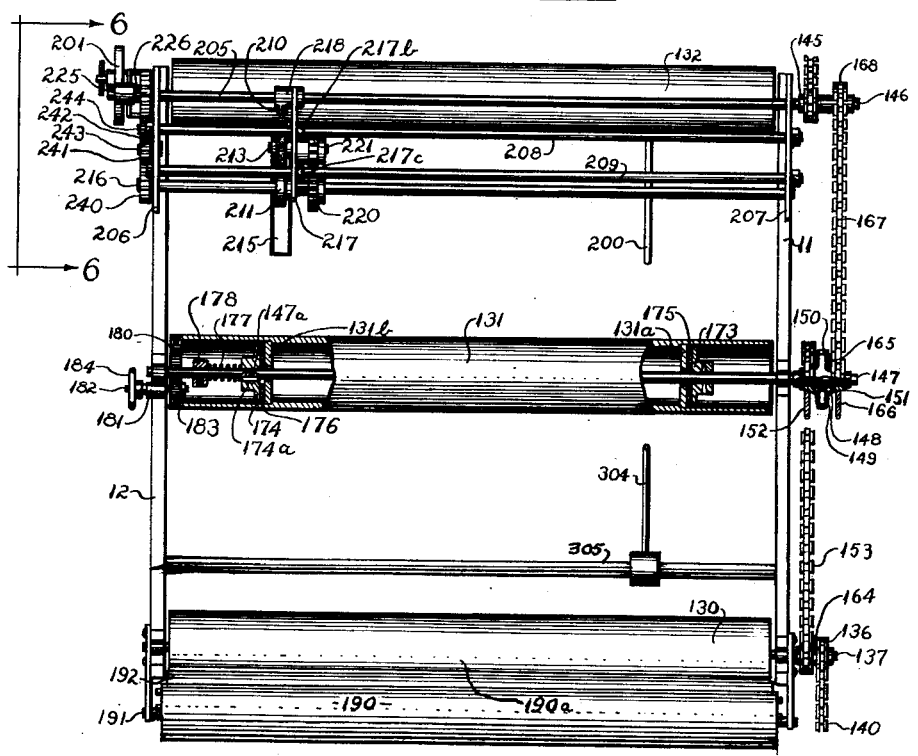
Inventor
Urban C. Haren

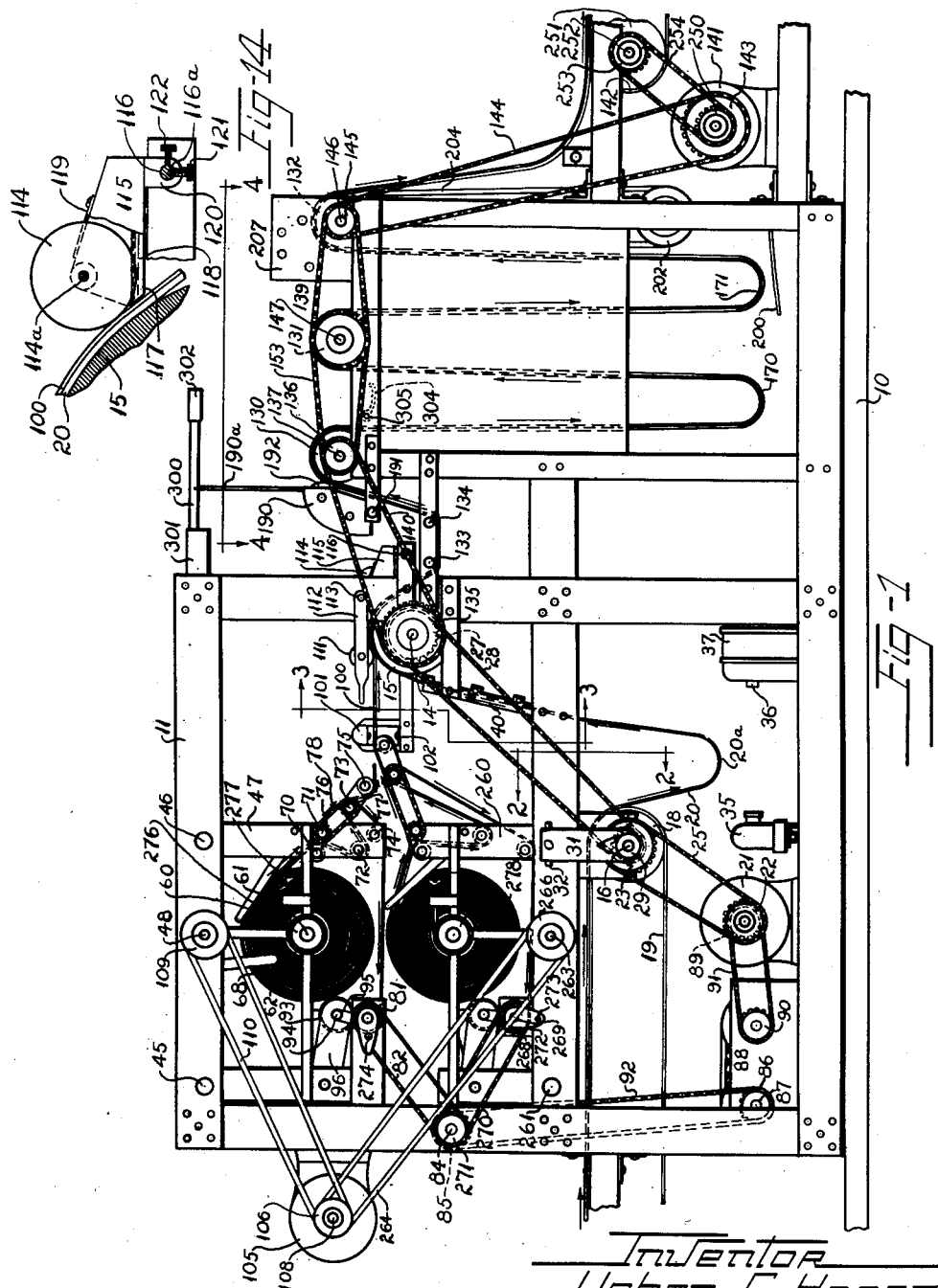

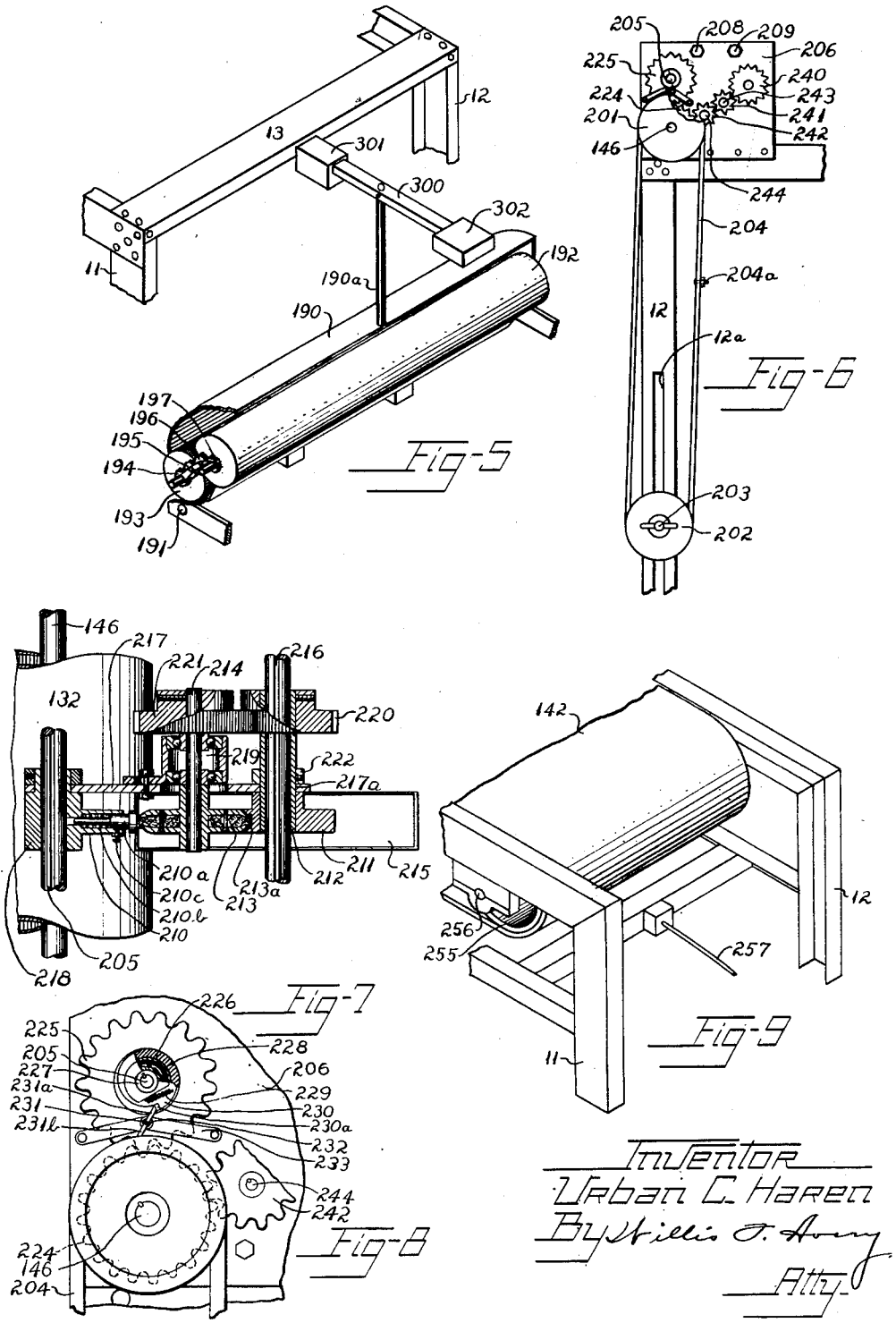

July 18, 1944.   U. C. HAREN   2,354,120
APPARATUS FOR ASSEMBLING SHEET MATERIALS
Filed Oct. 15, 1941   4 Sheets-Sheet 4
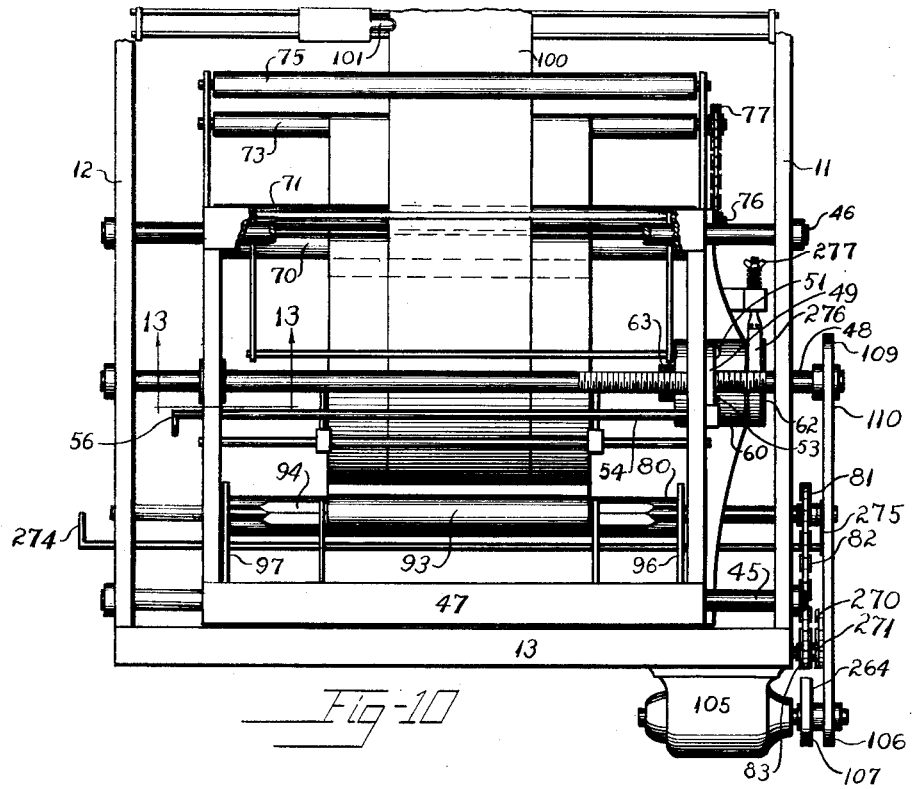
Fig-10
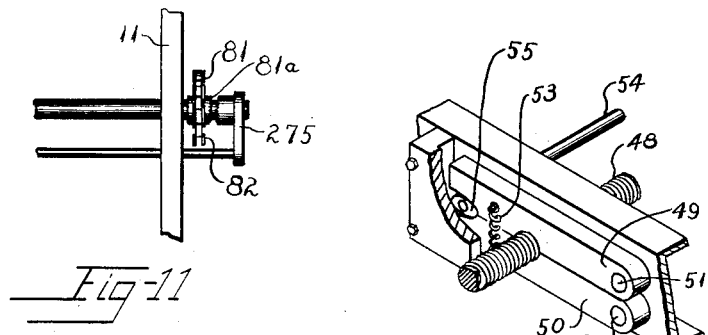
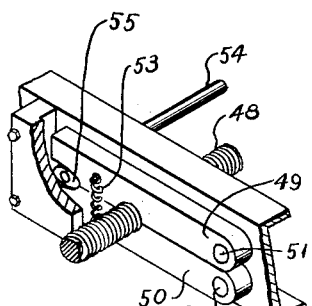
Fig-12
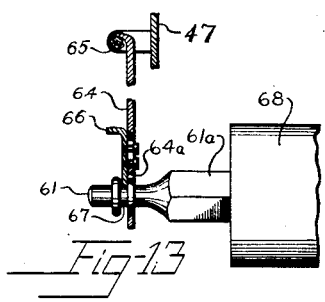
Fig-13
Fig-11
Inventor
Urban C. Haren Patented July 18, 1944

2,354,120

UNITED STATES PATENT OFFICE 2,354,120

APPARATUS FOR ASSEMBLING SHEET MATERIAL

Urban C. Haren, Akron, Ohio, assignor to The B. F. Goodrich Company, New York, N. Y., a corporation of New York Application October 15, 1941, Serial No. 415,063

4 Claims. (Cl. 154—1)

This invention relates to apparatus for assembling sheet materials and is especially useful in the assembling of frictional fabrics, unvulcanized rubber or similar adherent materials, as in the building of tires.

In the manufacture of pneumatic tires, sheets of unvulcanized rubberized fabric and coatings of sheet rubber are assembled in band form and are then drawn over a building drum where bead cores and other parts of the tire casing are assembled therewith. Where it is necessary to assemble thin sheet rubber and cord fabric widths it has heretofore been difficult to properly align the sheets with each other and great waste of rubber material occurred. It has also been difficult, in the past, to unite the sheets face to face where the material was relatively dry or of a non-adhesive nature.

While it is desirable to supply the band builder constantly with a continuous supply of plied sheet material, attempts to accomplish this have in the past been unsuccessful due to irregularities in the sheet material and improper alignment of the plies.

The present invention aims to overcome the foregoing difficulties and to provide an improved product.

The principal objects of the invention are to provide sheet handling and assembling apparatus capable of a high degree of flexibility in operation to minimize wastage in large scale manufacture, to provide accuracy of alignment of the sheets or strips, to provide improved adhesion, to provide automatic markings on the sheet to facilitate further operations, to prevent the fabric from being contaminated by contact with the floor or otherwise, and generally to provide for convenience and efficiency of procedure.

These and other objects will appear from the following description and the accompanying drawings.

Of the drawings,

Fig. 1 is a side elevation of apparatus corresponding to and embodying the invention, portions being broken away.

Fig. 2 is a detail sectional view taken on line 2—2 of Fig. 1, parts being broken away.

Fig. 3 is a sectional view of the center-line marking mechanism taken on line 3—3 of Fig. 1, other parts being broken away.

Fig. 4 is a plan view of part of the apparatus showing the length marking mechanism and the festooning mechanism taken on line 4—4 of Fig. 1, other parts being broken away.

Fig. 5 is a detail perspective view of the moistening rolls, parts being broken away.

Fig. 6 is an end elevation of the length marking mechanism, as indicated at 6—6 in Fig. 4, other parts being broken away.

Fig. 7 is a detail plan view of the printing carriage of the length marking mechanism, parts being broken away.

Fig. 8 is a detail elevation of the measuring mechanism, parts being broken away.

Fig. 9 is a perspective view of the delivery end of the outgoing conveyor showing the switch for stopping the conveyor other parts being broken away.

Fig. 10 is a plan view of part of the apparatus, showing the sheet rubber delivery and guiding mechanism, parts being broken away.

Fig. 11 is a detail view of a drive clutch, other parts being broken away.

Fig. 12 is a detail perspective view of a separable nut for moving the supply carriage, other parts being broken away.

Fig. 13 is a detail sectional view of the stock roll support taken on line 13—13 of Fig. 10, parts being shown in section, and parts broken away.

Fig. 14 is a detail view of the line-printing mechanism, parts being shown in section and parts broken away.

In accordance with the invention a continuous sheet of rubberized material is fed from a supply and a continuous sheet of unvulcanized rubber is fed from a second supply and the two sheets are accurately guided into alignment and assembled face to face, a line is printed longitudinally on the assembled sheet while it is so guided, the sheet is moistened with solvent, and is measured and marked at cutting positions in a combined operation.

Referring to the drawings, the apparatus comprises a bed plate 10 to which are fixed in parallel relation, side frames 11, 12, held in spaced apart relation by braces, such as 13 (see Fig. 5). A horizontal shaft 14 is rotatably mounted in bearings fixed to the side-frame members 11, 12 and has an assembling drum 15 fixed thereto (see Figs. 1 and 3). A second shaft 16, parallel to shaft 14, is rotatably mounted in bearings 17 fixed to the side frame members, and has a drum 18 fixed thereto about which a conveyor belt 19 is trained. Rubberized fabric material 20, either woven or cord, is delivered by this conveyor from any convenient source, not shown, as a continuous strip and is delivered to the assembling drum therefrom. For driving the assembling drum, an electric motor 21 is fixed to the bed plate and has a sprocket wheel 22 fixed to its shaft. A sprocket wheel 23 is fixed to a quill 24 (see Fig. 2) rotatably mounted on shaft 16 and driven from sprocket 22 by a chain 25. Another sprocket 26 is also fixed to quill 24 (see Fig. 2) and drives a sprocket 27, fixed to shaft 14 by a chain 28 (see Fig. 3). The arrangement is such that due to the sprocket ratios, the fabric 20 is delivered faster from the conveyor 19 than the surface speed of the drum 15 and the fabric 20 hangs in a free untensioned loop 20a between drums 18 and 15.

Quill 24 (see Fig. 2) is formed on one end with clutch teeth 24a, and a collar 29 is slidably mounted on the shaft 16 and provided with cooperating clutch teeth 29a. The shaft 16 has a feather key and the collar a keyway for engaging it. Collar 29 has an annular groove 29b adapted to be engaged by a shifter fork 31 pivoted at 32. A coil spring 33 urges the clutch collar away from the quill and normally holds the clutch in disengaged position. A solenoid 34 is arranged to draw the clutch into engaged position when it is energized. A light source 35 (see Fig. 1) is adapted to throw a beam of light across the space below loop 20a and a photoelectric cell 36 is located in the path of the light beam. An electrical apparatus 37 of which the photoelectric cell is a part is connected to solenoid 34 by wires (not shown), the arrangement being such that when the beam of light is uninterrupted between the light source 35 and the photoelectric cell, the apparatus 37, commonly known as an "electric eye" holds the clutch in engagement and conveyor belt 19 is driven by motor 21 which simultaneously drives drum 15, and when the loop 20a drops too low it interrupts the light beam, the solenoid 34 is deenergized, and the coil spring 33 disengages the clutch until the rotation of drum 15 raises the loop 20a out of the beam. The arrangement is such that the untensioned loop is retained at all times to permit accurate guiding of the sheet.

A guide 40, comprising cross bars 41, 42, under which the material is threaded and fences 43, 44 (see Fig. 3) adjustable with relation thereto, is mounted on the frame members 11, 12 in the path of the fabric between the loop 20a and the drum 15. The fences may be set for different widths of fabric, and due to the untensioned condition of the fabric, it is accurately aligned on the drum by the guide.

For delivering a sheet of rubber to the fabric in accurate alignment therewith, a pair of horizontally disposed guide rods 45, 46 (see Fig. 1) are fixed to frame members 11, 12 and a carriage 47 (see Fig. 10) is slidably mounted on the rods between the frame member 11, 12. A feed screw 48 (see Fig. 10) is journaled in the frame members 11, 12 parallel to the guide rods. A pair of threaded half-nuts 49, 50 (see Fig. 12) are pivoted to the carriage, as at 51, 52 and an extension coil spring 53, the ends of which are fixed to the half-nuts at their opposite ends normally holds them in engagement with the thread of the screw so that rotation of the screw 48 causes the carriage to move along the guide rods. A rod 54 extends parallel to the feed screw through bearings formed in the carriage. It has a cam 55 (see Fig. 12) fixed to one end thereof and located between the half-nuts and a handle 56 fixed to its other end whereby it may be rotated to separate the half-nuts and permit the carriage to be moved independent of the feed screw.

Fixed to one side of the carriage 47 is a bearing 60 (see Figs. 1 and 10) in which a shaft 61 is rotatably journaled. A brake drum 62 is fixed to the shaft at one side of the bearing and collar 63 is fixed to the shaft at the other side. Between the sides of the carriage, the shaft 61 is squared as at 61a (see Fig. 13). To provide against over-running of the stock roll, a band brake 276 is fixed to the carriage 47 so as to engage the drum 62, and a tension screw 277 is provided to adjust its pressure on the drum. A swinging bearing arm 64 (see Fig. 13) is pivoted, as at 65 to the carriage 47 and may be swung over the end of shaft 61, a clearness opening 64a being provided for the purpose of clearing the shaft. A latch 66 on the arm is adapted to engage a groove 67 formed in the shaft. A stock shell 68 having a squared opening and carrying a supply of unvulcanized calendered rubber wound between convolutions of a liner may be supported by the squared portion of the shaft and the arm 64 may be swung aside to place new shells of stock on the shaft.

For stripping the rubber from the liner and rewinding the liner, a plurality of horizontal idler rolls 70, 71, 72, 73, 74, 75 (see Fig. 1) are journaled on the carriage. Rolls 70 and 71 are close together and of small diameter. Rolls 71 and 73 are provided with sprockets 76, 77 connected by a chain 78 so that they run at the same speed. The arrangement is such that the non-stretchable liner is drawn from shell 68 over roller 70 under roller 72 over roller 73 and over roller 74 whereas the rubber passes over roller 71 over roller 73 where it again contacts the liner and under roller 75. In passing roller 73 which it engages in a bight of the liner, the liner drives this roller which in turn drives roller 71 by reason of the sprockets and chain. Roller 71 being close to roller 70 pulls the rubber from the liner at a sharp angle.

A rubber covered roller 80 (see Figs. 1 and 10) is journaled in side frame members 11, 12 and has a sprocket 81 rotatably journaled thereon and adapted to be driven by a chain 82 from a sprocket 83 on a shaft 84 also journaled in the side frame members. Sprocket 81 is formed with clutch teeth 81a (see Fig. 11). A clutch member 275 having cooperating teeth is slidably mounted on the shaft of roller 80 over a feather key thereon and is adapted to be engaged or disengaged with the roller to drive it. Shaft 84 is in turn driven by a sprocket 85 fixed thereto from a sprocket 86 fixed to a shaft 87 of a variable speed transmission 88 of the Reeves type through a chain 92. The transmission is driven by motor 21 through a sprocket 89 on the motor shaft, a sprocket 90 on the variable speed transmission, and a chain 91. An empty stock shell 93 (see Figs. 1 and 10) is rotatably supported on a rod 94 rotatably held in notches 95 of a pair of swinging arms 96, 97 pivotally mounted on the carriage so as to rest on the rubber covered roll 80 and be driven thereby. The arrangement is such that at any position of the carriage the empty shell may be driven from the rubber covered roll.

For guiding the rubber material, the unsupported rubber sheet 100 passes under roll 75 to drum 15 where it meets the fabric sheet 20. Between the roller 75 and the roller 15 a light beam source 101 is mounted adjustably from the side frame members 11, 12 (see Figs. 1 and 10) above the rubber sheet and a photoelectric cell 102 is mounted directly below it. An electric reversible motor 105 is mounted on the side frame members 11, 12 and has a pair of grooved pulleys 106, 107 (see Fig. 10) fixed to its shaft 108. A grooved pulley 109 is fixed to feed screw 48 in line with pulley 106 and is driven therefrom by a belt 110. The photoelectric cell controls the operation of motor 105. It is adjusted so that when the web of rubber is properly aligned with the fabric the beam of light is partly cut off from reaching the cell. When the rubber web shifts to one side it exposes completely the cell which starts the motor 105 operating in a direction which turns feed screw 46 in a direction to move the carriage to a position where the beam is again partly covered whereupon the motor stops. When the cell is completely eclipsed by the sheet it starts the motor in the reverse direction and moves the carriage in the opposite direction until a balanced light condition is attained.

An idler roller 111 (see Fig. 1) is rotatably mounted in a swing frame 112, pivoted at 113 on the frame members 11, 12 and bears on the roll 15 to roll the materials together face to face.

To provide for accurately aligning the combined material in subsequent processes, a printing roller 114 (see Figs. 1, 3, and 14) of the disc-like form is adapted to bear against the material while it is in contact with the drum 15 (see Fig. 3). The printing roller is rotatably mounted on a pin 114a carried by an arm 115 pivotally mounted on a rod 116. The arm is formed with a tank 117 for holding printing ink 118 with which the disc contacts at all times. A slotted scraper 119 is fixed to arm 115 with its slot just clearing the disc to remove excess ink. A keeper 120 is adjustable along rod 116 and may be clamped thereto at any position therealong by a thumbscrew 121 engaging a keyway 116a in the rod to hold the arm against movement along the rod. The arm 115 is free to rock about the rod 116 and rests by its weight against roll 15 but may be raised away from the roll and locked in the raised position by a lock screw 122 threaded through the arm and engageable with the rod 116.

The apparatus provides for feeding the compound strip forward to provide a festooned supply thereof from which it may be intermittently withdrawn. For this purpose a series of parallel horizontal rolls 130, 131, 132 (see Figs. 1 and 4) are rotatably mounted between the side frame members 11, 12, parallel to roll 15. A pair of smaller guide rollers 133, 134 (see Fig. 1) are also rotatably mounted between rolls 15 and 130 for directing the strip.

For driving roll 130, a sprocket 135 is fixed to shaft 14, another sprocket 136 is fixed to a shaft 137 of roll 130, and a chain 140 is trained about the sprockets. Roll 132 is driven by a motor 141 which also drives a conveyor belt 142. A sprocket 143 fixed to the motor shaft engages a chain 144 which engages a sprocket 145 fixed to a shaft 146 to which roll 132 is fixed. Roll 131 is rotatably mounted on a shaft 147 (see Fig. 4). A differential spider 148 is fixed to shaft 147 and a pair of bevel pinions 149, 150 are rotatably mounted on radial legs of the spider. A bevel gear 151 is rotatably mounted on shaft 147 adjacent one side of the spider in a position to mesh with pinions 149, 150, and has a sprocket 152 fixed thereto. Sprocket 152 is driven by a chain 153 from a sprocket 154 fixed to shaft 137. A second bevel gear 165 is also rotatably mounted on shaft 147 adjacent the other side of spider 148 in a position to mesh with pinions 149, 150 and has a sprocket 166 fixed thereto. Sprocket 166 is driven by a chain 167 from a sprocket 168 fixed to shaft 146. The arrangement is such that when supply of strip material by roll 15 equals withdrawal thereof over roll 132, sprockets 152 and 166 are driven at the same speeds and shaft 147 is rotated at the same velocity as sprockets 152, 166. Should either roll 130 or 132 stop, stopping either supply or withdrawal of material, the speed of roll 131 will be decreased to one-half its regular speed. Any difference in relative speeds of rolls 130 and 132 will result in a corresponding change in speed of roll 131. The compound strip is festooned over rolls 130, 131, 132 in loops 170, 171 and the differential gearing is adapted to keep these loops equal in length.

To provide for equalizing the loops when threading the apparatus or whenever differences occur, a disc 173 is fixed to shaft 147 and a second disc 174 is slidably mounted on the shaft and has a keyway 174a engaging a key 147a on the shaft. Roll 131 has a pair of flanges 131a, 131b, fixed thereto. Washers 175, 176 of friction material, such as leather, are located between disc 173 and flange 131a and between disc 174 and flange 131b respectively, and a coil spring 177 about shaft 147 between disc 174 and a collar 178 fixed to the shaft holds the washers under compression and frictionally drives the roll from shaft 147. An internally toothed ring gear 180 is fixed to the roll 131 at one end thereof. A bearing 181 is provided on the frame member 12 for a shaft 182 which has a pinion 183 fixed thereto and meshing with gear 180. A hand wheel 184 is fixed to shaft 182. The arrangement is such that roll 131 may be rotated about shaft 147 by rotation of the hand wheel 184 and when the hand wheel is freed it will rotate, driven by the ring gear 180.

For moistening the compound strip material to freshen its adhesive coating a trough 190 (see Fig. 5) for holding a solvent is located adjacent roll 130 and is pivotally mounted at 191 on the frame members 11, 12. A roll 192 having a cushion face of solvent resisting rubber-like material, such as polymerized vinyl chloride, is rotatably mounted in the trough in a position to contact the face of roll 130 and be driven by such contact. A second roll 193, parallel thereto dips in the solvent and is rotatably journaled in the trough so as to contact the face of roll 192. A train of gears 194, 195, 196, 197 between rolls 193 and roll 192 drives them in unison. The arrangement is such that strip material passing over roll 130 contacts roll 192 and drives roll 193 therefrom and roll 193 becomes wet with solvent and transfers it by way of roll 192 to the strip.

As contact of the moistening roll with the material should occur only when the material is moving, means are provided for lifting the moistening roll from the strip material whenever the roll 130 stops rotating. For this purpose, the trough 190 has an arm 190a fixed thereto to which is secured an armature 300. A solenoid 301 is fixed to the frame of the machine and is arranged to attract the armature and draw the roll 192 out of contact with roll 130 whenever motor 21, which drives roll 130, stops. A weight 302 attached to arm 190a returns the roll 192 to contact with the strip whenever motor 21 is started and solenoid 301 is simultaneously deenergized.

To prevent the roll 130 from delivering strip material after the loops 170, 171 have reached a desired length, a lever 200 is pivoted on the frame with its free end extending below the loop 171. This lever is adapted to open an electrical relay circuit which controls the operation of motor 21 so that upon contact of loop 171 the lever is depressed and the motor 21 is stopped.

To prevent tearing of the material in case the motor 141 continues to run after the motor 21 is stopped for a time sufficient to consume all the material in the loops 170, 171, a contact lever 304 is pivoted at 305 on the frame of the machine in a position to contact with the loop 170, when that loop is nearly exhausted. This lever is attached to a mercury switch in the control circuit of motor 141 and is arranged to stop the motor when the lever 304 is raised.

For marking the compound strip as a visual index to cutting the strip apart in making bands, a grooved pulley 201 (see Figs. 6 to 8) is fixed to shaft 146. A similar pulley 202 is rotatably mounted on a stud 203 adjustably fixed to the frame member 12 in a slot 12a formed therein. An elastic rubber measuring belt 204 is trained about these pulleys and has a stop 204a fixed thereto.

Directly above shaft 146 is a shaft 205 parallel thereto and journaled in stationary plates 206, 207 (see Figs. 4, 6, and 7) fixed to the frame members 11, 12, a carriage plate 217 being supported between the frame members by stay rods 208, 209 along which it is slidable and adjustable (see Figs. 4 and 7). Shaft 205 (see Fig. 7) is splined and has a printing arm 210 fixed to a quill 218 slidable along the shaft 205 and rotatably confined in plate 217. The end of the arm 210 is adapted to contact with the material on the face of roll 132. For this purpose a type element 210a is slidably mounted in the arm for radial movement and is forced outwardly by a coil spring 210b, and restrained in its outermost position by a screw 210c. An ink well 215 is supported by carriage plate 217 for movement with it. An ink roll 211 is fixed to a quill shaft 212, rotatable in plate 217, in a position to dip in the ink. A distributing wheel 213 is fixed to another shaft 214 rotatably mounted in a bearing 219 adjustably fixed to plate 217, and has a felt rim 213a adapted to roll on roll 211 continuously and to be contacted by the type element 210a. Quill shaft 212 is rotatably mounted in a bearing 217a formed in carriage plate 217 and is slidably mounted on a splined shaft 216. Quill 212 has a gear 220 fixed thereto. Roll 211 is adjacent the bearing at one side of plate 217. A collar 222 is fixed to the quill shaft 212 at the other side of the plate 217. A gear 221 is fixed to shaft 214 and meshes with gear 220.

The arrangement is such that the carriage plate 217 may be moved along rods 208, 209 and locked thereto by set screws 217b, 217c at any desired position therealong and carries with it the printing mechanism which may be driven at any such position by splined shafts 205 and 216. A scraper is pivotally mounted on ink well 215 and removes excess ink from roller 211.

Shaft 146 (see Fig. 8) has a gear 224 fixed thereto adjacent plate 206. A gear 225 is fixed to a quill 226 (see Fig. 4) rotatably journaled on shaft 205 and constituting the drive member of a Hilliard one-revolution clutch. The driven member 227 of the clutch is keyed to the shaft 205. These members are spaced apart radially from each other. An annular cage member 228 between them holds a series of rollers, and by rotation of the cage the rollers may engage between driving and driven members to engage them frictionally but they are normally held in disengaged position by a spring 229. A trip cam 230 is attached to the cage and has a projecting stop 230a. A trip lever 231 is pivotally mounted on a stud 232 fixed to a stationary yoke 233 mounted on plate 206. The lever has a short arm 231a which normally stands in the path of cam stop 230a and holds the cam in disengaged position. It also has a longer arm 231b which normally rests on the belt 204 in the path of stop 204a. The arrangement is such that when the stop 204a passes the lever arm 231b the clutch is engaged and shaft 205 is driven through one revolution by shaft 146 through gears 224 and 225 rotating the arm 210 and causing the type element 210a to first pick a supply of ink from roll 213 and then contact the sheet material passing over roll 132 to which it transfers a spot of ink. Belts 204 of different lengths may be interchanged with each other for placing marks at different distances along the material by adjusting pulley 202 along slot 12a and due to the elasticity of the belts, one belt may be stretched more or less to change its length and therefore the spacing of the marks.

For driving the inking rolls continuously, a gear 240 (see Fig. 6) is fixed to shaft 216 adjacent plate 206 and a train of gears 241, 242, are rotatably mounted on stub shafts 243, 244 fixed to plate 206 between gears 224 and 240 and meshing therewith. The arrangement is such that shaft 216 is rotated continuously when shaft 146 is rotating.

The marked strip material is delivered from roller 132 to conveyor belt 142 by gravity. For driving conveyor belt 142 (see Fig. 1), a sprocket 250 is fixed to the shaft of motor 141 which drives roller 132. A conveyor drum 251 is fixed to a shaft 252 rotatably mounted between frame members 11, 12 and supports a bight of the conveyor belt. A sprocket 253 is fixed to shaft 252 and is driven by a chain 254 from sprocket 250.

The delivery end of the conveyor belt 142 is supported by a drum 255 (see Fig. 9) fixed to a shaft 256 rotatably mounted in bearings on frame members 11, 12. The upper reach of the conveyor may be employed for supporting the material while it is separated into lengths at the positions of the marks printed on the strip. To prevent the operation of the conveyor when the sheet material is delivered beyond its remote end a feeler arm 257 is mounted on the frame of the apparatus in the path of material descending from the end of the conveyor and is adapted to open an electric circuit controlling the operation of motor 141. The arrangement is such that the descending material will stop the motor 141 and therefore the roller 132 and conveyor belt 142 operated thereby.

To provide for supply of sheet rubber material without great delay in changing rolls thereof duplicate mechanism for feeding sheet rubber material operable alternately is provided. For this purpose a carriage 260 substantially identical to the carriage 47 is slidably mounted on cross rods 261, 262 fixed to frame members 11, 12. A feed screw 263, identical to screw 48 is used for moving the carriage and is journaled in the frame members and is driven by a belt 264 from a pulley 107 (see Fig. 10) fixed to the shaft of motor 105 to a pulley 266 fixed to screw 263. The arrangement is such that both carriages are controlled in unison from the same electric eye mechanism. Carriage 260 cooperates with a liner windup mechanism identical with that of carriage 47 and comprising a rubber-covered driving roll 267, journaled in frame members 11, 12, having a sprocket 268 jouraled on its shaft 269 and driven by a chain 270 from a sprocket 271 fixed to shaft 84. A clutch member 272 is slidably mounted on shaft 269 over a feather key thereon and is adapted to engage a cooperating clutch member formed on the sprocket 268. A shifter rod 273 is slidably mounted in the frame members 11, 12 and has a handle 273a for operating it to engage or disengage the clutch members. A similar shifter rod 274 is provided to shift the clutch member 275 previously mentioned. The arrangement is such that both windup driving rolls 93 and 267 are driven from motor 21 and may be driven alternately by engaging their clutches alternately. As the windup driving rolls operate to deliver the rubber material by pull on the liners, rotating the stock rolls at a uniform surface speed, the arrangement provides for operating from the rolls of material in succession without great delay.

A brake drum 278 is provided on the stock roll shaft of the carriage 260 to prevent overrunning of the roll.

The operation of the apparatus is as follows:

Rolls of sheet rubber material such as on shell 68, and empty stock shells such as 93, are placed on the carriages 47 and 260 in the position shown in Fig. 1 and the leading ends of the liners on the rolls of rubber are threaded through the stripping rolls and around the rubber covered windup driving rolls 94 and 268 as shown and are wrapped a single turn about the empty stock shells. The leading end of one of the rubber sheets is pulled forward and permitted to extend over the stripping rolls 71, 73, and is stuck to itself about roll 75 until the operator is ready for it. Both clutch shifter rods 273 and 274 are adjusted to disengage the clutches on the windup driving rolls 93 and 267. Conveyor belt 19 is put in operation by starting motor 21 and a strip of fabric is fed therealong to form a loop 20a, the leading end being threaded through the guide 40 and over roll 15. At this point roll 111 is raised and lowered over the end of the strip. The leading end of the rubber strip is then advanced through the electric eye arrangement and is stuck to the fabric on the roll 15 and clutch shifter 274 is operated to engage the clutch on the windup driving roll. Motor 105 is then started and at the same time current is supplied to the electric eye mechanisms 101 and 35. The variable speed changer 88 may be adjusted to the correct speed ratio to prevent stretching of the rubber.

The leading end of the compound strip is lead under rolls 133, 134 and over roll 130. The line printing apparatus is started by filling the tank 117 and adjusting the printing roller 114 into contact with the strip. The solvent applying roller 192 is supplied with solvent. The strip is draped over rolls 131, 132 and the measuring apparatus is adjusted by supplying a belt 204 of correct length, filling the well 211, and adjusting the plate 217 to the desired position. Motors 21 and 141 are started and thereafter the material continues its course through the apparatus. Should the conveyor 19 feed the fabric too fast, the loop 20a will intercept the beam of light from light source 35 and disengage the clutch member 28 until the beam again strikes the cell 36 when the clutch will again be engaged.

When the rubber material of the first stock roll is exhausted, the rubber from the second roll is stuck to the rubber of the trailing end of the first roll, the shifter rod 274 is operated to disengage the clutch and shifter rod 275 is operated to engage the second clutch to drive the second stock roll. The loop 20a permits such change without stopping the travel of the fabric.

When material is not removed as delivered from conveyor belt 142, the leading end of the strip runs over the conveyor and depresses the lever 287 stopping motor 141 and roll 132 and conveyor belt 142. The motor 21 continues running until the loop 171 depresses lever 200 whereupon motor 21 is automatically stopped. When the attendant removing the material from conveyor belt 142 resumes removing material, he manually closes the circuit controlling motor 141 starting that motor.

Should motor 21 be stopped with motor 141 still operating, the material of loop 170 will become exhausted eventually and by raising lever 304 will stop motor 141 until motor 21 is again started and the loop 170 is lowered out of contact with lever 304.

Great flexibility of operation is provided by the apparatus making possible the assembly of strips of different widths, thicknesses and material, and the marking of the material in different lengths. The apparatus may be used without employing the moistening device or the line printing and length printing mechanisms if desired and lengths of fabric may be festooned and printed or moistened without applying a rubber strip thereto if desired. Such flexibility of operation is of advantage in large scale factory operations on tires. A great saving in rubber material is also possible by use of the apparatus as the rubber material is applied with very little waste.

Variations may be made without departing from the scope of the invention as it is defined by the following claims.

I claim:

1. Apparatus for assembling adherent unvulcanized sheet material, said apparatus comprising means for guiding a strip of adhesive material to an assembling station, a supply of unvulcanized extensible sheet material interwound with a liner and liner rewinding means therefor adjustable in a direction lateral of the path of travel of the strip, means located between said supply and the assembling station and responsive to lateral shifting of the sheet material for automatically controlling the adjusting movement of said supply and rewinding means to align a sheet of material delivered therefrom with said strip at the assembling station, and means at the assembling station for pressing said sheet into engagement with said strip.

2. Apparatus for assembling adherent unvulcanized sheet material, said apparatus comprising means for guiding a strip of adhesive material to an assembling station, a supply of unvulcanized extensible sheet material interwound with a liner and liner rewinding means therefor adjustable in a direction lateral of the path of travel of the strip, light-responsive means located between said supply and the assembling station and responsive to lateral shifting of the sheet material for automatically controlling the adjusting movement of said supply and rewinding means to align a sheet of material delivered therefrom with said strip at the assembling station, and means at the assembling station for pressing said sheet into engagement with said strip.

3. Apparatus for assembling sheet material, said apparatus comprising means for guiding a strip of adhesive fabric material to an assembling station, a supply of unvulcanized extensible sheet material interwound with a liner and liner rewinding means therefor adjustable in a direction lateral of the path of travel of the strip, means located between said supply and the assembling station and responsive to lateral shifting of the sheet material for automatically controlling the adjusting movement of said supply and rewinding means to align a sheet of material delivered therefrom with said strip at the assembling station, and means at the assembling station for pressing said sheet into engagement with said strip and for marking a center line on the extensible sheet material while it is supported against shifting by said strip.

4. Apparatus for assembling adherent unvulcanized sheet material, said apparatus comprising means for guiding a strip of adhesive fabric material to an assembly station free from tension, a supply unit comprising a roll of unvulcanized extensible sheet material interwound with a liner and liner rewinding means therefor adjustable in a direction lateral of the path of travel of the strip, means for delivering sheet material from said supply unit to said assembly station, means at said assembly station for assembling said sheet material and said strip face to face, and means for automatically guiding said sheet material into alignment with said strip as the sheet material approaches the assembly station by adjustment of said supply unit, said last named means comprising an energy source adapted to project a beam across space adjacent to the aligned path of the sheet material, and means effected by interception of the beam by shifting of the sheet to control lateral adjustment of the supply unit in a direction to align the sheet material with said strip.

URBAN C. HAREN.